United States Patent [19]
Rudder

[11] Patent Number: 5,173,092
[45] Date of Patent: Dec. 22, 1992

[54] HYDROCARBON REMOVAL SYSTEM

[75] Inventor: Tucker D. Rudder, Lubbock, Tex.

[73] Assignee: Hydrocarbon Recovery Equipment, Inc., Lubbock, Tex.

[21] Appl. No.: 636,615

[22] Filed: Dec. 29, 1990

[51] Int. Cl.$^5$ .............................. B01D 19/00
[52] U.S. Cl. ........................ 55/53; 55/196; 210/778; 210/170; 405/52; 415/182.1; 415/203
[58] Field of Search .......... 55/53, 196; 210/788, 210/789, 94, 258, 416.1, 416.3, 512.1, 532.2, 104, 108, 109, 170; 405/52; 415/182.1, 203

[56] References Cited
U.S. PATENT DOCUMENTS

| | | | |
|---|---|---|---|
| 660,214 | 10/1900 | Gathman | 210/788 |
| 2,098,608 | 11/1937 | Berges | 210/512.1 |
| 3,959,139 | 5/1976 | El-Hindi | 210/512.1 |
| 4,273,650 | 6/1981 | Solomon | 210/109 |
| 4,663,037 | 5/1987 | Breslin | 210/170 |
| 4,844,812 | 7/1989 | Haynes et al. | 210/104 |
| 4,892,664 | 1/1990 | Miller | 55/53 |
| 4,954,266 | 9/1990 | Lingo | 210/170 |

Primary Examiner—Bernard Nozick
Attorney, Agent, or Firm—Coffee - Novak

[57] ABSTRACT

A process and system for separating and removing volatile organic compounds (VOCs) from groundwater, where said groundwater is polluted by immiscible liquid floating on the water table and by solutes within the water. The process includes pumping the contaminated water through a separator and low pressure tank assembly, that separates silt, sand, and liquid VOCs from the water. The water is pumped through an air stripper to remove the dissolved volatiles from the water. The recovered liquid VOCs from the pressure tank are suitable for processing or reuse. The volatiles liberated from the water in the air stripper are released either to the atmosphere or routed to pollution abatement devices as required by environmental rules. The decontaminated water is released to a sewer system or to the environment.

21 Claims, 2 Drawing Sheets

HYDROCARBON REMOVAL SYSTEM

BACKGROUND OF THE INVENTION (1) Field of the Invention

This invention relates generally to the field of water treatment, and more particularly to systems used to separate and remove both floating and dissolved volatile organic compound (VOC) contaminants from groundwater sources.

(2) Description of the Related Art

Environmental regulations require the cleanup of spills from underground storage tanks containing fuels or other light density hazardous materials at commercial or industrial locations which impact groundwater aquifers. Such rules mandate removal of immiscibles floating on the aquifer surface and the solutes that have dissolved into the water.

Known methods for removing floating VOCs include the use of bailers, skimmer pumps and other devices. Proposed methods for removing dissolved VOC contaminants from water include such techniques as: pumping and air stripping, vaporization of the entire liquid stream with selective recondensation of the water, hydrocarbon contaminant adsorption, biological reduction by aggressive organisms, and chemical treatments.

A common problem in the cleanup of volatile hydrocarbon materials which have leaked from underground storage tanks is containment and recovery of spilled contaminants. After the contaminants have migrated vertically downward through the vadose zone, a portion of said contaminants will float on the water table as a separate phase and a portion will dissolve into the groundwater.

The areal spread of contaminants about a groundwater aquifer is known as a contaminant plume and is defined by hydrogeological studies. Once a plume is defined, attempts are made to control or confine further spread of the plume. However, plume confinement is often complicated by the fact that aquifers act as underground rivers and may exhibit substantial horizontal movement. In addition, aquifer movement is affected by nearby water wells which may draw the plume toward those wells. Drinking water supplies can easily become polluted by these migratory contaminants. Therefore, swift recovery of the plume is a frequent tactic in groundwater cleanups to minimize migration of the spilled contaminants.

Recovery of the liquid phase, or "free product", that floats freely on the surface of the water table is particularly troublesome in the cleanup of groundwater contaminated by light density VOCs. Extraction of free product from groundwater is a complex procedure complicated by the logistics of accurately setting removal equipment at the point of density change where the free product and water interface occurs. This positioning is required so that the floating free product above this point can be recovered.

It is difficult to maintain the extraction equipment at the appropriate level as the water table elevation changes and to extract the free product quickly before the contaminant plume moves away from the recovery well. Additional problems encountered in the recovery process are: voluntary segregation of the floating free product into multiple floating pools which are not interconnected, limited accessibility to the water table due to the small physical size of the recovery wells, and restrictions upon the number of extraction wells imposed by the high cost of drilling and installing the wells.

With the bailer systems previously mentioned, either a bucket type bailer or a pipe bailer with a one-way valve is repeatedly lowered to the water table to retrieve the free product. Both automated and manual bailing systems are used, however, bailing is slow and the automated bailers are prone to mechanical problems.

With skimmer pumps, either a fixed position pump or a floating pump is lowered into a well and positioned at the free product interface at the top of the water phase. The floating free product is then pumped or skimmed. Like bailing, skimming is also a slow recovery process and considerable difficulty exists in controlling the appropriate depth for fixed position skimming pumps due to changes in water table elevation. With each change in water table elevation, fixed position skimming pumps must either be manually repositioned or automatically repositioned using sophisticated and expensive telemetry controls. Additionally, both fixed position and floating skimmers are prone to foul due to sand, fine silt or other contamination from the aquifer.

A common method of plume control includes drilling one or more wells into an aquifer and pumping water therefrom with submersible pumps. The removal of water draws the migrating plume toward the recovery wells thereby localizing said plume. The contaminated groundwater is pumped to the surface grade level from within the well where said water is treated and decontaminated. During the process, water is pumped at a sufficient volume and rate to draw down the water level of the aquifer and create a vortexial cone of depression above the pump inlet. Freely floating VOCs migrate along the surface of the water table and are drawn into the cone of depression by gravity where said VOCs are maintained for removal by bailing or skimming.

While undesirable, the free product floating within the cone of depression may be occasionally drawn into the recovery pump in a bailing or skimming process if the pumping rate is too high or if the drawdown capacity of the aquifer changes. Cavitation may also occur with excessive pumping if the rate at which water is removed by the pump is greater than water can flow to the pump within the aquifer.

U.S. Pat. No. 4,892,664 to MILLER discloses a system for decontamination of sites where organic compound contaminants endanger the water supply. An apparatus is shown in MILLER that includes an air stripper and catalytic converter. Volatile organic compounds are first stripped from groundwater so that a VOC laden vapor is created that is then burned through a catalytic stage that oxidizes the organic compounds.

U.S. Pat. No. 4,722,800 to AYMONG discloses an oil-water separator. AYMONG shows a baffled holding tank that is used to separate both solids and immiscible liquids from a solution.

U.S. Pat. No. 4,526,692 to YOHE discloses a process for purification of contaminated groundwater. YOHE shows a system used to purify a domestic water supply. In this process, water is brought up from a well, purified, and then returned to the well beneath the ground.

U.S. Pat. No. 4,139,463 to MURPHY discloses a method of and means for oily water separation. MURPHY shows a two tank system used together with a suction pump to withdraw oil and water from a ship's bilge or sump. The two tanks are then used to allow the heavier water to separate from the lighter fluids.

Other patents which disclose means for separating petroleum products from water include:
U.S. Pat. No. 745,519 Pravicha,
Russian Patent No. 1313483 Mutin,
Russian Patent No. 1414402 Didenko.

E. SUMMARY OF THE INVENTION

(1) Progressive Contribution to the Art

This invention comprises a process and apparatus for separating and removing undissolved and dissolved VOC contaminants from groundwater more practically and economically than presently known systems. It is particularly useful in the treatment of water contaminated by gasoline and other fuels leaked or spilled from underground storage tanks. Highly efficient removal of dissolvable components associated with gasoline such as benzene, toluene, and xylene is accomplished. This invention comprises several well known devices such as downhole submersible pumps and air strippers.

The process for removing and recovering the VOC pollutants from the groundwater includes pumping the contaminated water from one or more groundwater wells with submersible pumps. The contaminated water is then introduced into a cyclone separator for removal of solids. From the separator, the water goes through a bypass style piping system and into a pressure rated vessel or gravity separation tank where the water is retained for a sufficient amount of time to allow separation into an upper phase of floating liquid free product above a lower water phase. The floating free product is withdrawn from near the top of the pressure vessel. The water is bled from the bottom of the pressure tank to an air stripper where said water is introduced into the top of a vertical packed column. The water which is still laden with dissolved VOCs flows by gravity down through the column, while a flow of air is directed up through the packed column to airstrip the volatile compounds from the water. The vaporized VOCs are typically released to the atmosphere, and the decontaminated water is channeled to a public sewer or released to the environment.

A primary benefit of this invention is its aggregation of the several components needed for VOC recovery from an underground water supply into a single skid mounted pump and treat equipment assembly. The invention provides a self-contained unit that is portable between recovery well sites. Additionally, only one submersible pump is used in the extraction of both VOC free product floating above the water table and groundwater contaminated by dissolved VOC components below the free product. Most known recovery systems require at least one pump and another means for lifting the free floating VOCs to the ground's surface. This invention eliminates the need for free product bailing or skimming systems that typically serve as the other means for lifting the free floating VOCs.

This invention allows the submersible pump to be positioned at a single fixed position within the water table when extracting both floating free product pollutants and dissolved contaminants. By fixing the position of the pump the need for sophisticated telemetry controls required by several known methods is eliminated. Further, this invention utilizes a pump of centrifugal design which is less prone to fouling by granular solids than are bladder or diaphragm pump systems. An additional benefit of using a single centrifugal pump is the ease by which the flow rate can be adjusted over a widely variable capacity of any given pump. Energy conservation is facilitated by the fact that the energy used by the centrifugal pump is proportional to the rate of flow pumped. This phenomenon is commonly described as "riding the horsepower curve".

Still further, this invention eliminates the need for auxiliary transfer pumps by driving the entire flow through the system with the single downhole submersible pump. The pressure required throughout the system is that pressure that will lift the fluid flow up to the top end of the stripper's packed tower. This required pressure is not very great and allows the system to operate under relatively low pressures. For this reason, this invention is safer than other VOC recovery systems that operate under higher pressure conditions.

(2) Objects of this Invention

An object of this invention is to remove and recover volatile organic compound contaminants from groundwater sources.

Further objects are to achieve the above with devices that are sturdy, compact, durable, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to implement.

The specific nature of the invention, as well as other objects, uses, and advantages thereof, will clearly appear from the following description and from the accompanying drawings, the different views of which are not necessarily scale drawings.

As an aid to correlating the terms of the claims to the exemplary drawings, the following catalog of elements and steps is provided:

| 10 | groundwater well | 24 | cyclone separator |
|----|------------------|----|-------------------|
| 12 | submersible pump | 26 | cyclone exit shut off valve |
| 14 | conduit | 28 | low flow branch subassembly |
| 16 | free product separation stage | 30 | isolation valve |
| 18 | air stripper | 32 | filter assembly |
| 20 | skid assembly | 34 | low flow union |
| 22 | cyclone inlet shut off valve | | |
| 36 | low flow balancing valve | 74 | collection sump |
| 38 | high flow branch subassembly | 76 | stack |
| 40 | isolation valve | 78 | diffuser grate |
| 42 | automatic valve | 80 | packing |
| 44 | high flow union | 82 | spray head |
| 46 | high flow balancing valve | 84 | mist eliminator |
| 48 | bypass control piping assembly | 90 | VOC removal and recovery system |

-continued

| 50 | gravity separation tank | 100 | gravel packing |
| 52 | upper tank shut off valve | 102 | slotted casing |
| 54 | manway | 108 | cone of depression |
| 56 | metering control piping assembly | 110 | aquifer |
| 58 | pressure cock and gauge assembly | | |
| 60 | flow meter | | |
| 62 | pressure control valve | | |
| 64 | sampling cock | | |
| 66 | totalizing meter | | |
| 68 | meter union | | |
| 70 | packed tower | | |
| 72 | air blower | | |

DESCRIPTION OF THE PREFERRED EMBODIMENT

Figure 1:
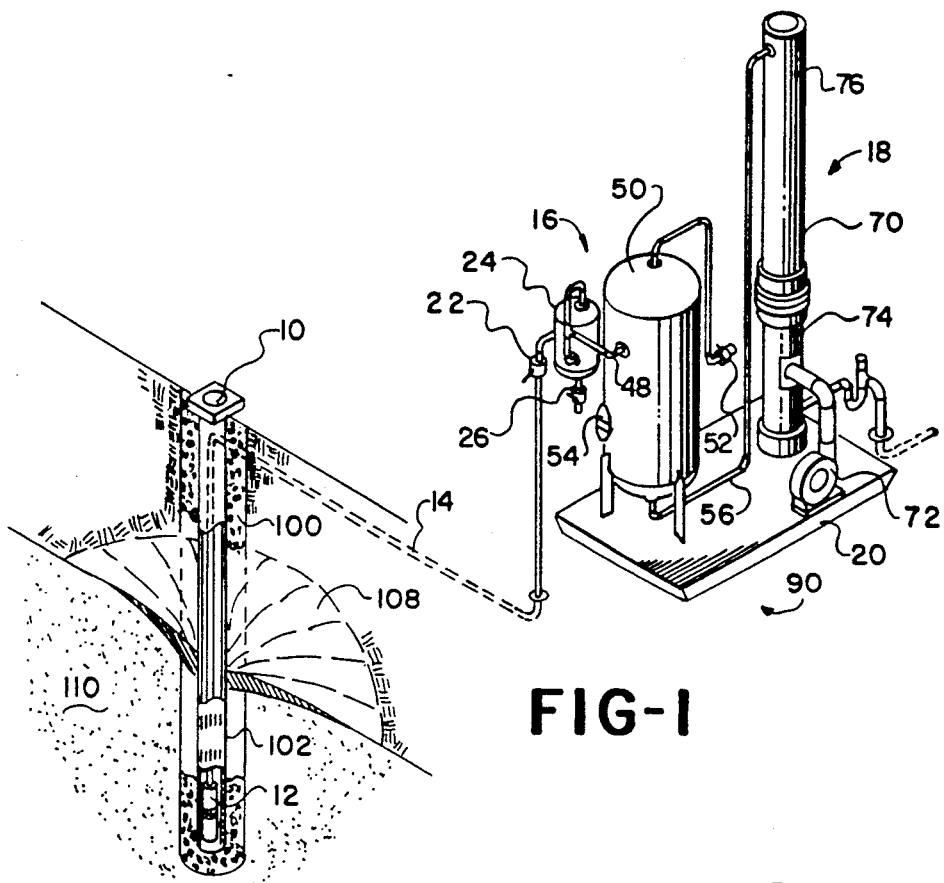
FIG. 1 is an elevational view showing the invention during primary operation.
Figure 2:
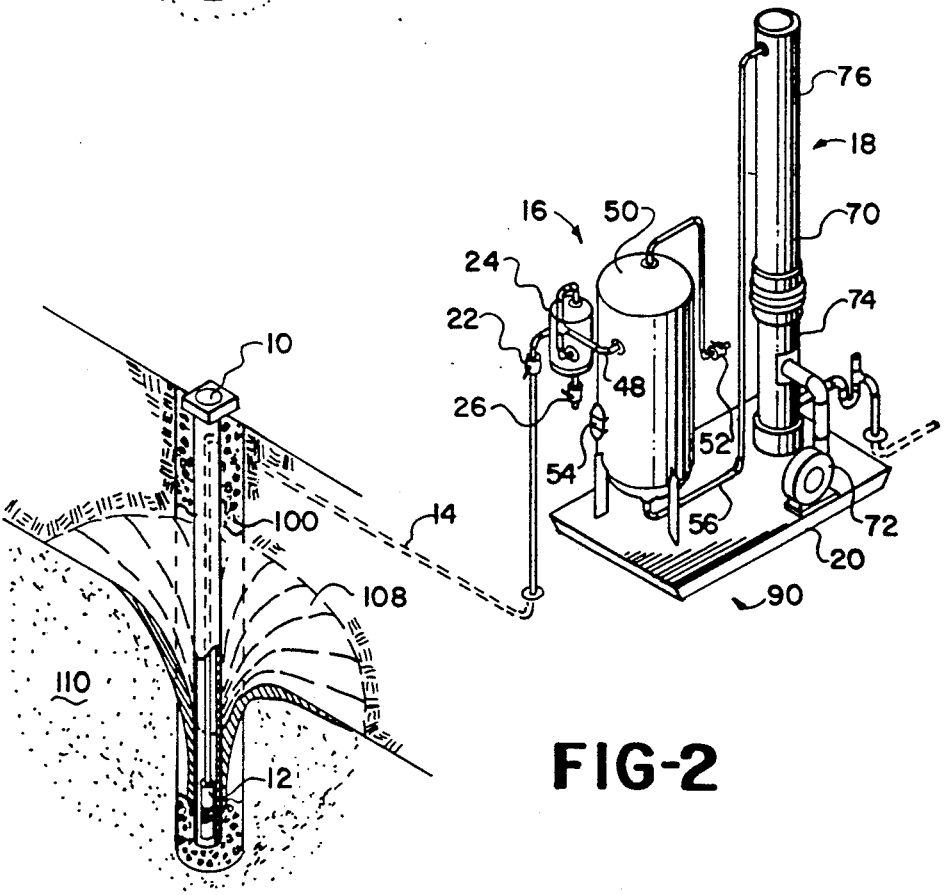
FIG. 2 is an elevational view showing the invention during secondary operation.

Referring to FIG. 1 and FIG. 2 of the drawings, a submersible pump 12 may be seen in a groundwater or recovery well 10, located in the vicinity of a gasoline service station, commercial facility, or industrial facility which has experienced a leak from an underground storage tank system. The pump 12 pumps contaminated groundwater to a skid mounted volatile organic compound (VOC) removal and recovery system 90. The system 90 for treating the contaminated water includes a free product separation stage 16 and an air stripper 18. Conduit 14 is a pumped discharge line and connects the submersible pump 12 to the free product separation stage 16.

The free product separation stage 16 consists of a forty (40) gallon capacity cyclone separator 24, a bypass control piping assembly 48, a one thousand (1,000) gallon capacity pressure-rated vertical gravity separation tank 50, and a metering control piping assembly 56.

The air stripper 18 consists of a packed tower 70 connected to the metering control piping assembly 56. Air blower 72 is also connected to the packed tower 70. All components of both the free product separation stage 16 and air stripper 18 are mounted on skid assembly 20.

The groundwater well 10 has gravel packing 100 around a slotted casing 102 where said casing 102 has an internal diameter of approximately six (6) inches. The well 10 extends down from the ground's surface grade level to within an aquifer 110 that is a water supply. Water contained within the aquifer 110 creates a water table that resembles an underground pond that has a bottom and upper surface.

The submersible pumps 12 used at different recovery wells 10 will vary in flow rate capacity based upon variables such as well depth, recovery rate of the aquifer 110, and desired flow rate. Desired flow rates will typically range between five (5) and one hundred (100) gallons per minute.

The depth at which the submersible pump 12 is placed below the surface of the water of the aquifer 110 and the desired pump flow rate are critical to proper operation of the system 90. Both the depth and the flow rate are selected based upon hydrogeological calculations that describe the aquifer recovery rate and pump drawdown. When properly selected and operated, the submersible pump 12 creates a cone of depression 108 in the aquifer 110 about the well 10.

Undissolved VOCs will float on top of the water table within the aquifer 110. Free floating VOC plumes will migrate by gravity into the apex of the cone of depression 108 where said VOCs are trapped and concentrated in a phase of free product above an intake of the pump 12. Migration of free product and the contaminant plume away from the well 10 is limited and controlled by the rate of inward flow toward the recovery well 10 created by operation of the pump 12.

As illustrated in FIG. 1, during primary operation, submersible pump 12 continuously draws contaminated groundwater by suction from the recovery well 10. The contaminated groundwater is a fluid containing water, dissolved VOCs, undissolved VOCs, solids, and other components. Fluid withdrawn by the pump 12 is from a point below a surface of the water table and below the cone of depression 108. The fluid is pumped under pressure through the conduit 14 to the free product separation stage 16 from the pump 12. The fluid is introduced into the cyclone separator 24 through cyclone inlet shutoff valve 22 and a tangential piping inlet. The cyclone separator 24 acts as a means for separating solids from the fluid. The fluid enters the separator 24 through a tangential inlet that causes said fluid to course around the interior of said separator 24. This induces a circular swirling motion. The result is that solids are spun out of the fluid by centrifugal and gravitational action inside the separator 24. Settled solids are drained from the cyclone separator 24 by manually opening cyclone shutoff valve 26 on a short piping connection at a lower end of the cyclone separator 24.

During primary operation, solid-reduced fluid exits the cyclone separator 24 through a vessel side piping outlet only. From the side piping outlet the fluid routes through a low flow branch subassembly 28 of bypass control piping assembly 48 to the gravity separation tank 50. The fluid enters the gravity separation tank 50 through a tank side inlet located in an upper half of said tank 50.

Normally, collected fine solids in the separation tank 50 are flushed through the vessel into metering control piping assembly 56 via a connection located at a bottom end of the tank 50 while the system 90 is under operational pressure. The separation tank 50 may be cleaned through tank manway 54 on the side of the vessel when the tank 50 is empty and the system 90 is not operating.

Fluid exits separation tank 50 through a piping outlet located at the bottom of the tank 50, routes through the metering control piping assembly 56, and is introduced to air stripper 18 at a top end of the stripper 18. Water cascades down through the packed tower 70 while the air blower 72 forces air upward through the packed tower 70. The air flow from the air blower 72 strips the VOCs from the contaminated fluid by evaporating the more volatile VOC's out of the water.

With proper sizing, placement, and operation of submersible pump 12, the cone of depression 108 is controlled by changing the rate of fluid flow from recovery well 10. During secondary operation, the flow rate of the pump 12 is increased. The increase in flow rate increases the diameter of the cone of depression, enlarges the perimeter of aquifer influence that the well 10 has, and draws the apex of the vortexial cone of depression 108 down toward an intake of the pump. Secondary operation influences the cone of depression 108 sufficiently to pull the immiscible VOCs floating in the apex of the cone of depression 108 into the intake of the pump 12. Such pumping is referred to as overpumping. However, overpumping must be conducted in brief intervals; otherwise the pumped flow will exceed the aquifer recovery rate and momentarily run the pump dry by drawing air through the pump's 12 intake thus cavitating the pump.

Over time, short periods of secondary operation between extended periods of primary operation removes the immiscible free product VOCs from the surface of the groundwater.

As illustrated in FIG. 2, during secondary operation both the groundwater contaminated with dissolved VOCs and the immiscible VOC's floating on the top of the water table in the apex of the cone of depression are drawn by suction into the submersible pump 12 and pumped under pressure through conduit 14 to free product separation stage 16. Properly scheduled intervals of secondary operation lasting thirty seconds to a minute approximately every three hours draws the floating undissolved VOCs into separation stage 1 without creating excess mixing or entrainment of the immiscible VOCs with the groundwater. The above described interval is what has been typical; each interval specific to a particular recovery well is dictated by the characteristics of the surrounding aquifer. It is envisioned that the interval could be increased to where the secondary operation periods last for as much as one minute for every hour of primary operation in an appropriate aquifer. The intermittent periods of secondary operation causes slugs of free product to be introduced into the system 90.

During secondary operation, the pumped water mixture exits the cyclone separator 24 through a side piping outlet and a top piping outlet of the cyclone separator 24. The exiting fluid routes through both low flow branch subassembly 28 and high flow branch subassembly 38 of bypass control piping assembly 48 to separation tank 50.

Separation tank 50 provides a means for separating VOC from fluid. The undissolved VOCs, also known as free product, separate out of the fluid inside separation tank 50 and float to the top of the fluid. Free product is drained from the separator tank 50 while the system is under pressure by opening upper tank shutoff valve 52 on a short piping line connected to a top end of the tank 50.

As shown in FIG. 1, during primary operation the pump 12 extracts from well 10 only fluid that is laden with dissolved contaminants without impacting the immiscible VOCs which are concentrated in the apex of the cone of depression and are floating above the water table.

As shown in FIG. 2, controlled overpumping during secondary operation draws both the soluble contaminated groundwater and the floating immiscible VOCs into the intake of pump 12.

Figure 3:
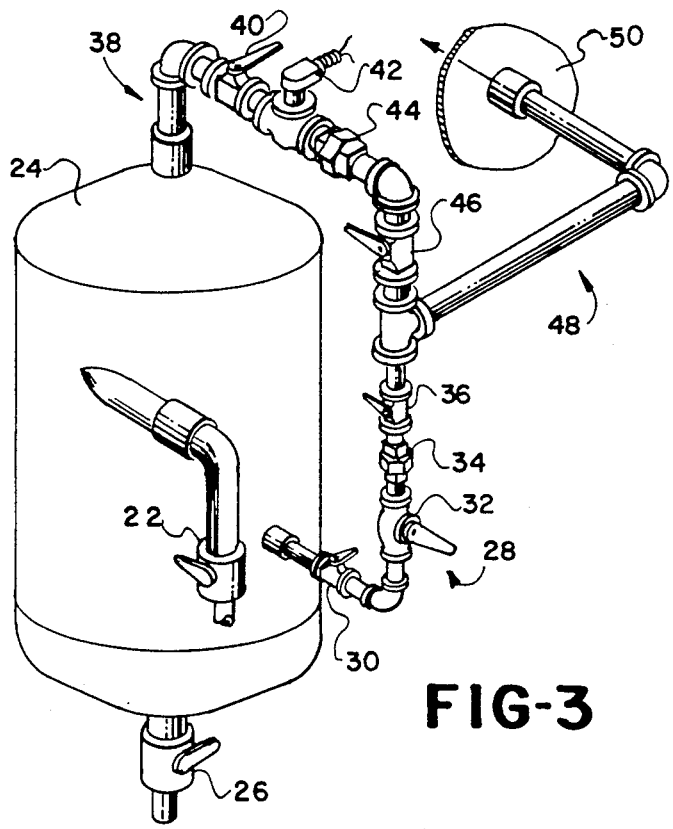
FIG. 3 is schematic drawing of the components comprising the bypass control piping assembly.

FIG. 3 shows the bypass control piping assembly 48 which is used to regulate the interval between primary operation and secondary operation. Bypass piping control assembly 48 includes two interconnected piping branch subassemblies. During primary operation, pumped fluid exits through the piping outlet on the side of cyclone separator 24 and routes into the low flow branch subassembly 28 which comprises isolation valve 30, filter assembly 32, low flow union 34, and low flow balancing valve 36.

During primary operation, automatic valve 42 in high flow subassembly 38 remains closed to restrict the passage of water to the low flow branch subassembly 28. The rate of flow from pump 12 through low flow subassembly 28 is controlled by balancing valve 36.

In secondary operation, pumped fluid exits cyclone separator 24 through the top piping outlet into high flow branch subassembly 38 and through the side piping outlet into low flow branch subassembly 28. High flow branch subassembly 38 is comprised of isolation valve 40, automatic valve 42, high flow union 44, and high flow balancing valve 46. Flow is allowed through the high flow branch subassembly 38 by the action of a timer that cyclically opens the automatic valve 42. Additionally, the flow rate in high flow branch subassembly 38 is regulated with the balancing valve 46.

Figure 4:
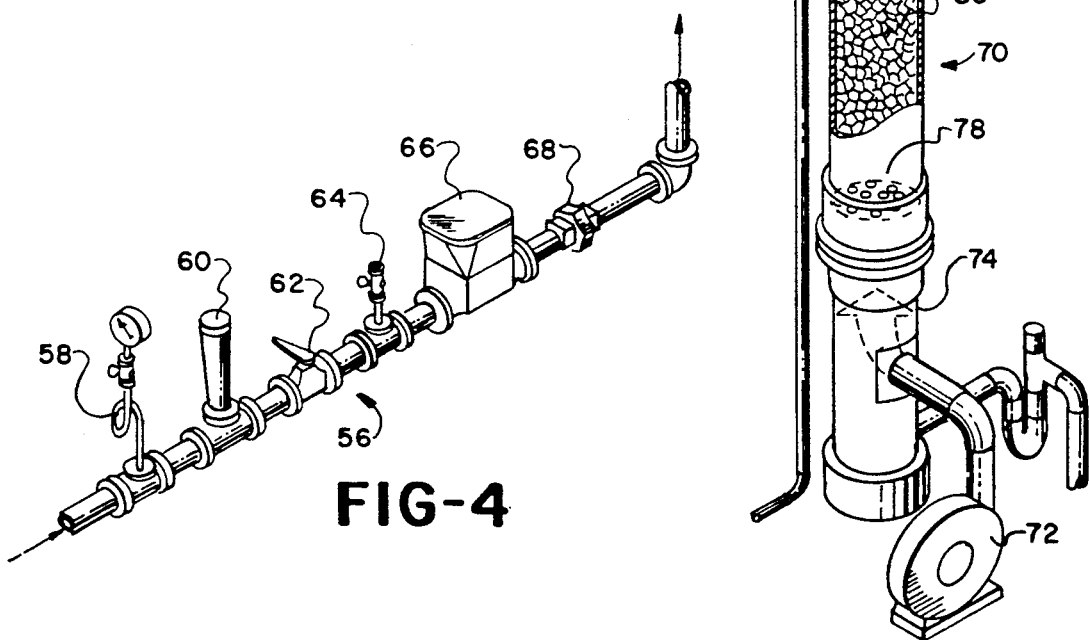
FIG. 4 is a schematic drawing of the components comprising the metering control piping assembly.

As illustrated in FIG. 4, the metering control piping assembly 56 comprises a pressure cock and gauge assembly 58, flow meter 60, pressure control valve 62, sampling cock 64, totalizing meter 66, and meter union 68. System back pressure and maximum achievable system flow rate through the separation tank 50 is controlled by pressure control valve 62 and said back pressure is derived exclusively from the pump 12. It is to be also understood that the flow rate through the system can be determined by setting the flow rate to be displaced by the pump 12. Further, the flow rates through the system may be set by other means than those specifically described herein.

The flows to be allowed during primary operation and secondary operation are measured at flow meter 60 and regulated by balancing valves 36 and 46. Water samples of the contaminated groundwater entering the air stripper 18 are taken at sampling cock 64. Totalizing meter 66 records the quantity of fluid treated in the air stripper 18 and satisfies the total flow metering requirements for most regulatory jurisdictions which levy charges for treated effluent discharged.

Figure 5:
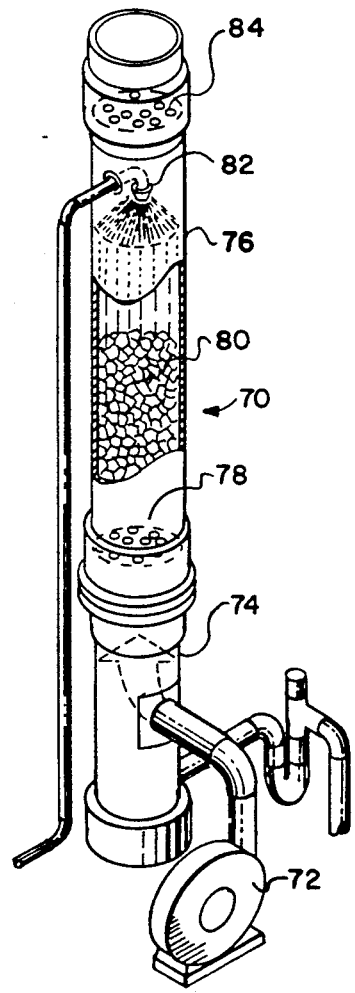
FIG. 5 is a cross-sectional view along the length of the air stripper.

As illustrated in FIG. 5, air stripper 18 is comprised of packed tower 70, air blower 72, and collection sump 74. Packed tower 70 includes a vertically positioned stack 76 which is constructed of either polyvinyl chloride plastic or stainless steel and rests on top of the water collection sump 74. Sump 74 and stack 76 are connected by a bolted flange assembly.

Stack 76 contains packing 80 similar to JAEGER INC. TRIPACK two inch diameter polypropylene spheroids resting on diffuser grate 78 just above collection sump 74. Pumped groundwater contaminated by dissolved VOCs enters packed tower 70 near the top of stack 76 and is distributed over the packing 80 by spray head 82. The spray head 82 sprays the fluid onto the exposed surfaces of the packing 80 allowing said water to cascade down through said packing 80. The spheroids are open web packing material which separates the water into small particles and creates a thin film over the large evaporative surface area of the packing.

The air blower 72 rated at 1,500 standard cubic feet per minute of air, discharges a flow of air into an upper portion of collection sump 74 just below diffuser grate 78. The air flows upward through the packing 80 in a counterflow to the contaminated water cascading downward within the stack 76. VOCs dissolved in the water are air-stripped by the upward air stream due to evaporation.

After being stripped, treated water free of VOC contamination passes through diffuser grate 78 into collection sump 74. Mist eliminator 84 is mounted above spray head 82 at the top of the packed tower 70 and is designed to stop liquid water particles which might otherwise be blown out of the top of the packed tower 70. VOC laden vapor passes through mist eliminator 84 at the top of packed tower 70.

Water which has been air-stripped and falls into collection sump 74 is substantially free of dissolved VOCs and is sufficiently decontaminated to permit discharge to a public sewer or to the environment. The decontaminated water is discharged from sump 74 near a bottom end of the stripper 18. For most applications, a trapped piping connection with sampling port at the sump discharge allows a final sampling point for verification of the effluent conditions.

After all of the floating free product has been recovered from the aquifer, the timer controls are re-adjusted to allow continuous pumping at some maximum rate which is low enough to minimize the risk of aquifer overpumping or cavitation. This latter stage provides an expedient means for removing the remaining water laden with dissolved VOCs.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim:

1. A method of removing and recovering volatile organic compounds which are contained in water supplies in an aquifer including the following steps:
   a. pumping a liquid that includes water, dissolved volatile organic compounds, and undissolved volatile organic compounds, from a water supply by
      a1. placing a single submersible pump in the water supply,
      a2. positioning the pump within the water supply so that said pump is submerged by liquid contained within the water supply and any volatile organic compounds floating at the top of said liquid,
      a3. establishing a primary operation by
         i. running the submersible pump at a flow sufficient for
         ii. drawing down a cone of depression in the liquid about the pump,
         iii. trapping floating volatile organic compounds within the cone of depression thereby
         iv. creating a floating phase of volatile organic compounds within the cone, and
         v. maintaining a level of liquid above an intake of the pump sufficient to prevent cavitation during primary operation while also
         vi. preventing the floating phase of the volatile organic compounds from entering the pump,
      a4. establishing a secondary operation by
         i. increasing the pump's flow sufficiently above said pump's flow during primary operation for
         ii. pulling the cone of depression down further so that the floating phase of volatile organic compounds within the cone of depression is drawn down to the level of the pump's intake, and
         iii. pumping liquid from the floating phase of volatile organic compounds,
      a5. cycling between primary operation and secondary operation so that during primary operation fluid is drawn predominantly from a phase of the liquid below the floating phase of volatile organic compounds and during secondary operation fluid is drawn predominantly from the floating phase of volatile organic compounds,
   b. separating the undissolved volatile organic compounds from the liquid by
   c. introducing the liquid into a gravity separation tank,
   d. retaining the liquid in the gravity separation tank until the undissolved volatile organic compounds float out of the liquid into a phase of free product, and
   e. separating the dissolved volatile organic compounds from the remaining liquid by
   f. passing the retaining liquid through an air stripper.

2. The method as defined in claim 1 further comprising:
   g. recovering the undissolved volatile organic compounds that have floated to a top of the liquid retained within the gravity separation tank by
   h. bleeding floating free product from within the gravity separation tank.

3. The method as defined in claim 1 further comprising:
   g. introducing the remaining liquid into the stripper near a top end of said stripper,
   h. allowing the remaining liquid to fall down through the stripper,
   j. breaking the remaining liquid into small particles by having said remaining liquid fall through packing, and
   k. blowing air up from near a bottom end of the stripper while the remaining liquid is falling down through said packing, thus
   l. evaporating the dissolved volatile organic compounds from the water.

4. The method as defined in claim 3 further comprising:
   m. directing a volatile organic compound laden vapor up through and out of the stripper.

5. The method as defined in claim 4 further comprising:
   n. recovering the undissolved volatile organic compounds that have floated to the top of the liquid retained within the gravity separation tank by
   o. bleeding floating free product from within the gravity separation tank.

6. A method of removing and recovering volatile organic compounds which are contained in water supplies in an aquifer including the following steps:
   a. pumping a liquid that includes water, dissolved volatile organic compounds, and undissolved volatile organic compounds, from a water supply by
      a1. placing a single submersible pump in the water supply,
      a2. positioning the pump within the water supply so that said pump is submerged by liquid contained within the water supply and any volatile organic compounds floating at the top of said liquid,
      a3. establishing a primary operation by
         i. running the submersible pump at a flow sufficient for
         ii. drawing down a cone of depression in the liquid about the pump,
         iii. trapping floating volatile organic compounds within the cone of depression thereby iv. creating a floating phase of volatile organic compounds within the cone, and
v. maintaining a level of liquid above an intake of the pump sufficient to prevent cavitation during primary operation while also
vi. preventing the floating phase of the volatile organic compounds from entering the pump, a4. establishing a secondary operation by
  i. increasing the pump's flow sufficiently above said pump's flow during primary operation for
  ii. pulling the cone of depression down further so that the floating phase of volatile organic compounds within the cone of depression is drawn down to the level of the pump's intake, and
  iii. pumping liquid from the floating phase of volatile organic compounds, a5. cycling between primary operation and secondary operation so that during primary operation fluid is drawn predominantly from a phase of the liquid below the floating phase of volatile organic compounds and during secondary operation fluid is drawn predominantly from the floating phase of volatile organic compounds, b. separating the solids from the liquid, and
c. separating the volatile organic compounds from the remaining liquid.

7. The method as defined in claim 6 wherein the step of separating volatile organic compound from the remaining liquid further comprises:
d. passing the remaining liquid through an air stripper.

8. The method as defined in claim 6 wherein the step of separating volatile organic compounds from the liquid further comprises:
d. introducing the remaining liquid into a gravity separation tank, and
e. retaining the remaining liquid in the gravity separation tank until the undissolved volatile organic compounds float out of the remaining liquid into a phase of free product.

9. The method as defined in claim 8 further comprising:
f. recovering the undissolved volatile organic compounds that float to a top of the remaining liquid retained within the gravity separation tank by
g. bleeding floating free product from within the gravity separation tank.

10. The method as defined in claim 6 further comprising:
d. introducing the remaining liquid into the stripper near a top end of said stripper,
e. allowing the remaining liquid to fall down through the stripper,
f. breaking the remaining liquid into small particles by having said remaining liquid fall through packing, and
g. blowing air up from near a bottom end of the stripper while the remaining liquid is falling down through said packing, thus
h. evaporating the dissolved volatile organic compounds from the water.

11. The method as defined in claim 10 further comprising:
j. directing a volatile organic compound laden vapor up through and out of the stripper.

12. The method as defined in claim 6 wherein the step for separating solids from the liquid further comprises:
d. passing the liquid through a cyclone separator.

13. The method as defined in claim 12 further comprising:
e. introducing the liquid into the cyclone separator in a manner that induces a circular swirling motion in liquid within said cyclone separator,
f. spinning suspended solids out of the liquid with centrifugal force generated by the swirling motion of the liquid, and
g. allowing remaining solids not spun from the liquid to fall from suspension when the swirling motion slows near a lower end of the cyclone separator.

14. The method as defined in claim 13 further comprising:
h. collecting the solids at the lower end of the cyclone separator,
j. removing the collected solids from the cyclone separator, and
k. directing a solid reduced liquid flow out of the cyclone separator.

15. The method as defined in claim 14 further comprising:
l. the step of separating volatile organic compounds from the remaining liquid further comprises passing the remaining liquid through an air stripper,
m. the step of separating volatile organic compounds from the liquid further comprises introducing the remaining liquid into a gravity separation tank,
n. retaining the remaining liquid in the gravity separation tank until the undissolved volatile organic compounds float out of the remaining liquid into a phase of free product,
o. recovering the undissolved volatile organic compounds that float to a top of the remaining liquid retained within the gravity separation tank by
p. bleeding floating free product from within the gravity separation tank,
q. introducing the remaining liquid into the stripper near a top end of said stripper,
r. allowing the remaining liquid to fall down through the stripper,
s. breaking the remaining liquid into small particles by having said remaining liquid fall through packing,
t. blowing air up from near a bottom end of the stripper while the remaining liquid is falling down through said packing thus
u. evaporating the dissolved volatile organic compounds from the water, and
v. directing a volatile organic compound laden vapor up through and out of the stripper.

16. A method of removing and recovering volatile organic compounds which are contained in water supplies in an aquifer including the following steps:
a. placing a single submersible pump in a well that has been sunk into an aquifer,
b. positioning the pump within the well so that said pump is submerged by liquid contained within the aquifer and any volatile organic compounds floating at the top of said liquid,
c. establishing a primary operation by
  i. running the submersible pump at a flow sufficient for
  ii. drawing down a cone of depression in the liquid about the well,
  iii. trapping floating volatile organic compounds within the cone of depression thereby
  iv. creating a floating phase of volatile organic compounds within the cone, and v. maintaining a level of liquid above an intake of the pump sufficient to prevent cavitation during primary operation while also
vi. preventing the floating phase of the volatile organic compounds from entering the pump,
d. establishing a secondary operation by
i. increasing the pump's flow sufficiently above said pump's flow during primary operation for
ii. pulling the cone of depression down further so that the floating phase of volatile organic compounds within the cone of depression is drawn down to the level of the pump's intake, and
iii. pumping liquid from the floating phase of volatile organic compounds,
e. cycling between primary operation and secondary operation so that during primary operation liquid is drawn predominantly from a phase of the liquid below the floating phase of volatile organic compounds and during secondary operation liquid is drawn predominantly from the floating phase of volatile organic compounds thereby
f. pumping fluid from the well during both primary and secondary operation.

17. A method of removing and recovering volatile organic compounds which are contained in water supplies in an aquifer including the following steps:
a. placing a single submersible pump in a well that has been sunk into an aquifer,
b. positioning the pump within the well so that said pump is submerged by liquid contained within the aquifer and any volatile organic compounds floating at the top of said liquid,
c. establishing a primary operation by
i. running the submersible pump at a flow sufficient for
ii. drawing down a cone of depression in the liquid about the well,
iii. trapping floating volatile organic compounds within the cone of depression thereby
iv. creating a floating phase of volatile organic compounds within the cone, and
v. maintaining a level of liquid above an intake of the pump sufficient to prevent cavitation during primary operation while also
vi. preventing the floating phase of the volatile organic compounds from entering the pump,
d. establishing a secondary operation by
i. increasing the pump's flow sufficiently above said pump's flow during primary operation for
ii. pulling the cone of depression down further so that the floating phase of volatile organic compounds within the cone of depression is drawn down to the level of the pump's intake, and
iii. pumping liquid from the floating phase of volatile organic compounds,
e. cycling between primary operation and secondary operation so that during primary operation liquid is drawn predominantly from a phase of the liquid below the floating phase of volatile organic compounds and during secondary operation liquid is drawn predominantly from the floating phase of volatile organic compounds thereby
f. pumping fluid from the well during both primary and secondary operation, and
g. controlling said cycling between primary operation and secondary operation with a timer at intervals determined by characteristics of the aquifer.

18. A method of removing and recovering volatile organic compounds which are contained in water supplies in an aquifer including the following steps:
a. placing a single submersible pump in a well that has been sunk into an aquifer,
b. positioning the pump within the well so that said pump is submerged by liquid contained within the aquifer and any volatile organic compounds floating at the top of said liquid,
c. establishing a primary operation by
i. running the submersible pump at a flow sufficient for
ii. drawing down a cone of depression in the liquid about the well,
iii. trapping floating volatile organic compounds within the cone of depression thereby
iv. creating a floating phase of volatile organic compounds within the cone, and
v. maintaining a level of liquid above an intake of the pump sufficient to prevent cavitation during primary operation while also
vi. preventing the floating phase of the volatile organic compounds from entering the pump,
d. establishing a secondary operation by
i. increasing the pump's flow sufficiently above said pump's flow during primary operation for
ii. pulling the cone of depression down further so that the floating phase of volatile organic compounds within the cone of depression is drawn down to the level of the pump's intake, and
iii. pumping liquid from the floating phase of volatile organic compounds,
e. cycling between primary operation and secondary operation so that during primary operation liquid is drawn predominantly from a phase of the liquid below the floating phase of volatile organic compounds and during secondary operation liquid is drawn predominantly from the floating phase of volatile organic compounds,
g. pumping the liquid that includes water, dissolved volatile organic compounds, undissolved volatile organic compounds, and solids from a water supply during primary and secondary operation,
h. separating the solids from the liquid, and then
j. separating the volatile organic compounds from the liquid.

19. The method as defined in claim 18 further comprising:
k. supplying all pressure for the subsequent steps after pumping the liquid from the water supply from output of the submersible pump.

20. The method as defined in claim 18 further comprising:
k. causing slugs of nearly pure volatile organic compound to be pumped from the well during secondary operation.

21. The method as defined in claim 20 further comprising:
l. the step of separating volatile organic compounds from the remaining liquid further comprises passing the remaining liquid through an air stripper,
m. the step of separating volatile organic compounds from the liquid further comprises introducing the remaining liquid into a gravity separation tank,
n. retaining the remaining liquid in the gravity separation tank until the undissolved volatile organic compounds float out of the remaining liquid into a phase of free product, o. recovering the undissolved volatile organic compounds that float to a top of the remaining liquid retained within the gravity separation tank by p. bleeding floating free product from within the gravity separation tank, q. introducing the remaining liquid into the stripper near a top end of said stripper, r. allowing the remaining liquid to fall down through the stripper, s. breaking the remaining liquid into small particles by having said remaining liquid fall through packing, t. blowing air up from near a bottom end of the stripper while the remaining liquid is falling down through said packing thus u. evaporating the dissolved volatile organic compounds from the water, and v. directing a volatile organic compound laden vapor up through and out of the stripper, and w. supplying all pressure for the subsequent steps after pumping the liquid from the water supply from output of the submersible pump.

* * * * *